UNITED STATES PATENT OFFICE.

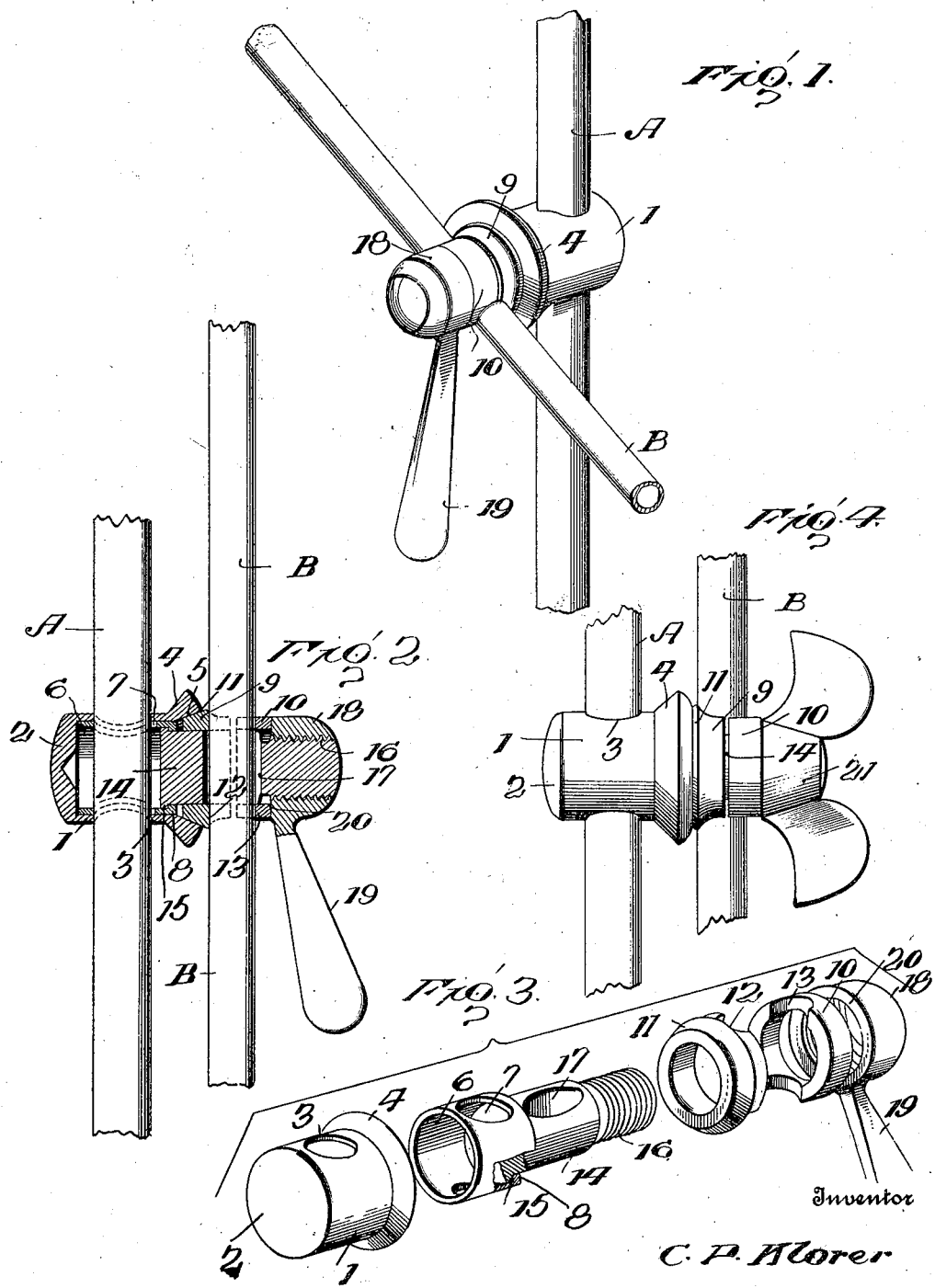

CHARLES P. KLORER, OF EAST CONEMAUGH, PENNSYLVANIA, ASSIGNOR OF TWO-THIRDS TO JOSEPH E. ZANG, OF JOHNSTOWN, PENNSYLVANIA.

FLEXIBLE CLAMP-JOINT.

1,217,960.  Specification of Letters Patent.  Patented Mar. 6, 1917.

Application filed October 12, 1915. Serial No. 55,491.

*To all whom it may concern:*

Be it known that I, CHARLES P. KLORER, a citizen of the United States, residing at East Conemaugh, in the county of Cambria and State of Pennsylvania, have invented certain new and useful Improvements in Flexible Clamp-Joints, of which the following is a specification.

This invention relates to clamp joints and has as its object to provide a clamp joint for use in connecting members which it is desired shall be capable of numerous relative adjustments and which joint will possess all of the advantages of the well known types of universal joints without, however, possessing any of their disadvantages and which will further possess the advantage of being adjustable to positively and rigidly hold the members clamped thereby in any desired position of relative adjustment. One disadvantage possessed by clamp joints of this general class is that they are liable to work loose and are, therefore, incapable of rigidly holding the members which they clamp, at a desired position of relative adjustment, with any degree of certainty. While it is desirable that a clamp joint of this class be capable of rigidly and securely holding the elements clamped thereby at any desired position of adjustment, it is also desirable that the joint be so constructed that it may be readily manipulated so as to so slightly release the clamping pressure upon the said members as to permit of them being readily relatively adjusted without, however, releasing them in such manner as to permit of accidental or free relative movement of the members which would in all probability require that both members be held while making the required adjustment.

Briefly stated, the joint embodying the present invention comprises assembled sets of clamping members and means for drawing the members of each set into clamping engagement with rods or the like assembled therewith and for drawing coöperating members of the two sets into mutual binding and frictional engagement whereby to hold the two sets of clamping members in positions of relative angular adjustment about a common axis and it is the primary aim of the invention to so construct those members of the two sets of clamping members which coöperate with each other, that the frictional engagement between said members will be of such character as to positively prevent relative angular movement of the sets of clamping members after the joint has been fully tightened. The present invention contemplates providing for a wedging as well as a simple frictional engagement between the coöperating members of the two sets of clamping members as distinguished from a simple frictional contact, for example, of two flat surfaces in a construction of which latter type it is practically impossible to secure through the medium of a hand manipulated nut or the like such firm frictional contact between the friction surfaces as will positively insure against disturbance of the adjustment.

In the accompanying drawings:

Figure 1 is a perspective view of the joint embodying the present invention.

Fig. 2 is a vertical longitudinal sectional view therethrough, the rods clamped by the joint being shown in elevation.

Fig. 3 is a group perspective view illustrating the parts of the clamp disassembled.

Fig. 4 is a side elevation of the clamp illustrating a slight modification in the structure thereof.

As before stated the clamp joint embodying the present invention includes two sets of clamping members and means for drawing the members of each set into clamping engagement with a rod assembled therewith which means serves also to cause frictional coöperation of a clamping member of one set with a clamping member of the other set. The numeral 1 indicates in general one of the clamping members of one of the sets and this member is in the form of a cylindrical thimble closed at one end as indicated at 2 and provided in its wall at diametrically opposite points with openings 3 which are of a diameter to slidably and yet snugly receive one of the rods to be supported by the clamp, this rod being indicated by the reference character A. At its end opposite its closed end the thimble 1 has its wall increased in thickness as indicated at 4 and the said thimble at its said end is exteriorly and interiorly flared as clearly shown in Fig. 2 of the drawings. The interior flared surface is indicated by the numeral 5 and this surface constitutes a friction surface as will be presently more full explained. The other member of this set is in the nature of a cylindrical thimble 6 which exteriorly is of a diameter to snugly, slidably and rotatably fit within the thimble 1 and the wall of the thimble 6 is formed at diammetrically opposite points with openings 7 which openings are of a diameter slightly greater than that of the openings 3 in the thimble 1. The thimble 6 is preferably open at both ends and that end of the thimble 6 which is located next adjacent the flared end 4 of the thimble 1, when the thimbles are assembled, is formed with an annular inwardly projecting flange 8. The thimble 6 is further of such length that when fitted within the thimble 1 and the rod A is inserted through the openings 3 and 7 in the two thimbles, the engagement of the walls of the openings 7 with the rod will prevent the flanged end 8 of the thimble 6 moving an appreciable distance into the flared end of the thimble 1 so that a member to be presently described and designed to coöperate with the friction surface 5 may be permitted to freely enter the flared end of the thimble 1 without interference on the part of the flanged end of the thimble 6. At this point it will be understood, and particularly by reference to Fig. 2 of the drawings, that when the rod A has been inserted through the openings 3 and 7 and the thimble 6 is moved in a direction as if to withdraw it from the thimble 1, the walls of the openings 3 and 7 will firmly and frictionally engage the surface of the said rod for the purpose of holding the same against longitudinal movement after it has been longitudinally adjusted through the openings.

The numerals 9 and 10 indicate the members comprising the other set of clamping members and each of these members is in the form of an annulus as will be observed by reference to Figs. 2 and 3 of the drawings. The member 9 is interiorly cylindrical but from substantially its middle to one end it is exteriorly conical so as to provide an exterior friction surface 11 having a taper corresponding to the flare of the surface 5. The member 9 at its other end is formed with approximately semi-cylindrical notches 12, the walls of which are designed to snugly embrace or fit one side of the other rod to be held by the joint, this rod being indicated by the reference character B. The member 10 is interiorly cylindrical and also preferably exteriorly cylindrical and is formed with notches or seats 13 corresponding to the notches 12 and designed to embrace the other side of the said rod B. However, the walls of the notches 12 and 13 have an angular extent of slightly less than a semi-circle so that when the clamping members 9 and 10 are assembled about the rods B their ends in which the notches are formed will be spaced apart so that there will be no interference with the desired frictional binding of the walls of the notches against the surface of the rod.

The means for drawing the clamping members into clamping engagement with the rods A and B and for frictionally binding a member of each set of the clamping members includes a bolt and a clamping nut threaded to the bolt. The bolt comprises a body 14 which is cylindrical and preferably solid and this body is formed at one end with a circumscribing flange 15 of substantially the same width as the flange 8. In assembling the bolt with the other parts of the structure the bolt is first inserted through the opening surrounded by the flange 8 with the flange 15 engaging behind the said flange 8 in the manner shown in Figs. 2 and 3 of the drawings, this engagement being such that the bolt may have rotative movement relative to the thimble 6. The bolt at the opposite end of its body is reduced and threaded as indicated at 16 and the body of the bolt is formed with a diametrically extending elliptical opening 17 at a point between its flanged end 15 and threaded end 16. The opening 17 at its minor axis is preferably of a diameter substantially the same as the diameter of the rod B and, of course, at its major axis it is of a diameter greater than the diameter of the said rod B. After the bolt has been assembled with the thimble 6 and the thimble has been fitted within the thimble 1, the clamping member 9 is fitted to the body of the bolt with its tapered end fitting within the flared end 5 of the said thimble 1. The rod B is then inserted through the opening 17 in the bolt with one side of the rod embraced by the walls of the opening 12. The clamping member 10 is then fitted to the bolt so that the walls of its notches 13 will embrace the other side of the rod B and there is then threaded on to the end 16 of the bolt a hand nut comprising the usual head 18 and handle 19, the head of the nut having a flat face 20 designed to bear against the end of the member 10 opposite the end in which the notches 13 are formed. If desired, the nut shown in Figs. 1 and 2 may be replaced by a wing nut 21 as illustrated in Fig. 4 of the drawings. Inasmuch as the opening 17 at its major axis is of a diameter greater than the diameter of the rod B the wall of the opening at the ends of this axis will be out of registration with the walls of the notches 12 and 13 in the clamping members 9 and 10 and consequently the bolt may have longitudinal play without the said portions of the wall of its opening 17 coming in contact with the rod B.

It will now be understood that with the parts assembled as above stated, the hand nut may be tightened whereupon the bolt 14 will be drawn longitudinally moving with it the clamping thimble 6 so that the walls of the openings 7 will bind against one side of the rod A and the rod will be brought into binding engagement at its other side against the walls of the openings 3. Also, inasmuch as the hand nut bears against the clamping member 10 this member will be forced into snug frictional engagement against one side of the rod B and the rod will be forced into firm engagement at its other side against the walls of the notches in the clamping member 9 thereby forcing the member 9 in the direction of the thimble 1 and causing its conical friction surface 11 to seat firmly against the flared friction surfaces 5 of the said thimble 1 and inasmuch as the member 9 is exteriorly conical and the thimble 1 is interiorly flared at its end which receives the said member 9, the engagement between these parts will be in the nature of a wedging engagement as well as a frictional one as clearly distinguished from a simple frictional engagement such as might be had between two flat or plane surfaces.

It will be further understood from the foregoing description of the invention that although when the hand nut is tightened the parts 9 and 4 are drawn into such firm frictional and wedging engagement that the adjustment cannot be disturbed even where great force is used, by slightly loosening the hand nut the rods A and B may be independently rotatably adjusted, independently longitudinally adjusted, and relatively angularly adjusted, although not released from clamping action to such an extent as to allow them to accidentally move relative to each other while being adjusted.

The rods A and B are here illustrated as devoid of connection with any specified element to be supported inasmuch as the joint may be employed for numerous purposes and is not limited to any particular manner of use. For example, one of the rods might constitute a relatively fixed upright and the other rod an arm for supporting an electric light fixture, mirror, or in fact, any object the position of which is desired or required to be adjusted, or the joint may be employed in the construction of an automobile wind shield or in the supporting of any article which it is desired to tilt to various positions of angular adjustment.

Having thus described the invention, what is claimed as new is:

In a joint of the class described, an outer member perforated for the passage of a supporting element and provided at one end with a flare providing a conical bearing surface, an inner member slidably fitted within the outer member and correspondingly perforated for the passage of said supporting element, a bolt having swivel engagement with the inner member, an annular clamping member through which the said bolt passes, the said clamping member being provided with an exteriorly tapered end provided with a conical bearing surface, the said end of the clamping member being fitted snugly and frictionally within the flare of the said outer member, an annular clamping member coacting with the first mentioned clamping member, and a nut engaging the threaded end of the bolt and arranged when tightened to engage the last mentioned clamping member whereby to force the annular clamping member toward each other and shift the inner clamping member with relation to the outer clamping member and simultaneously to force the tapered end of the first mentioned annular clamping member into the flare of the said outer member.

In testimony whereof, I affix my signature.

CHARLES P. KLORER. [L. S.]